United States Patent [19]
Willhite

[11] 3,893,034
[45] July 1, 1975

[54] SMOOTHING CIRCUITS

[75] Inventor: Charles C. Willhite, Convent Station, N.J.

[73] Assignee: Bell Telephone Laboratories, Incorporated, Murray Hill, N.J.

[22] Filed: Nov. 4, 1958

[21] Appl. No.: 771,923

[52] U.S. Cl. .................... 328/71; 328/167; 330/51; 330/103; 330/149
[51] Int. Cl. ............................................ H03k 17/02
[58] Field of Search ................ 250/27 Z, 27 R, 27 I; 333/79; 179/171, 8; 328/167, 71; 330/51, 103, 149

[56] References Cited

UNITED STATES PATENTS 2,931,901 4/1960 Markusen ........................... 328/167

*Primary Examiner*—Maynard R. Wilbur
*Assistant Examiner*—Richard E. Berger
*Attorney, Agent, or Firm*—K. B. Hamlin

EXEMPLARY CLAIM

5. In a control system, a direct current amplifier circuit, alternative long and short time constant smoothing circuits to be selectively employed with said amplifier circuit, each of said smoothing circuits including input and and feedback portions, means for initially selecting said short time constant smoothing circuit, circuitry for precharging both portions of said long time constant smoothing circuit and for grounding the midpoint of said long time constant circuit during the selection of said short time constant circuit, and means for thereafter switching over to said long time constant smoothing circuit.

5 Claims, 6 Drawing Figures

INVENTOR
C. C. WILLHITE
BY Kenneth B. Hamlin
ATTORNEY

INVENTOR
C. C. WILLHITE
BY Kenneth B. Hamlin
ATTORNEY

INVENTOR
C. C. WILLHITE
BY Kenneth B Hamlin
ATTORNEY

SMOOTHING CIRCUITS

This invention relates to control circuits and more particularly to systems in which smoothing circuits are employed to provide control signals.

In radar controlled anti-aircraft or anti-missile systems in which rates or derivatives of the input signals are employed for control or prediction, smoothing is used to suppress spurious high frequency signals. In order to obtain a precise control signal, a smoothing circuit having a relatively long time constant is sometimes employed. However, when circuits having long time constants are employed, they have correspondingly long "settling times" before a signal of reasonable accuracy is produced. The engineer or the user of the system must then determine whether he would prefer a quick but rough solution or a precise solution at a considerably later time.

Accordingly, the principal object of the present invention is to provide a circuit having a short settling time and a long smoothing time.

In accordance with the present invention, the foregoing object is attained by employing a circuit having two smoothing networks, one of which has a short time constant and the other having a long time constant. In one illustrative embodiment of the invention, an amplifier circuit is utilized with a short time constant circuit including input and feedback networks in addition to a long time constant circuit which also includes input and feedback networks connected generally in parallel with the comparable short time constant networks. The selection between the two feedback networks is made by grounding the point between the input and feedback networks of one of the two different smoothing networks and connecting the amplifier input to the midpoint of the other smoothing network. The output from the amplifier is connected to both feedback networks.

With this circuit arrangement, the short time constant circuit is initially connected to the amplifier while the midpoint of the input and feedback networks of the long time constant circuit network is grounded. During this initial period, the output signal reflects the short time constant smoothing circuit and provides a settled approximate answer after a short settling period. Meanwhile, input signals are applied to the input portion of the long time constant circuit and output signals from the amplifier are applied to precharge the feedback portion of the long time constant circuit. After a time period has elapsed which is about equal to the settling time of the short time constant network, a switching operation grounds the midpoint of the short time constant circuit and connects the midpoint of the long time constant circuit to the amplifier. Because of the precharging of both input and output portions of the long time constant network, the solutions available at the output of the amplifier are good approximate signals and increase in accuracy as additional time elapses. Accordingly, by the time a precise signal using the full accuracy of the long smoothing network is required, such a signal is available at the output of the amplifier.

It is a feature of the invention that an amplifier is provided with two smoothing networks having different time constants, and that switching circuitry is provided for initially coupling the network having a short time constant to the amplifier and for subsequently switching the long time constant smoothing circuit into operative relationship with the amplifier.

In accordance with another feature of the invention, a differentiation circuit includes a direct current amplifier and two smoothing networks having different time constants and connected generally in parallel. In addition, each of the smoothing networks has input and feedback portions, and circuitry is provided for initially connecting the midpoint between the two portions of the network having a short time constant to the input of the amplifier and the midpoint of the long time constant network to ground, and for subsequently interchanging these connections.

An important advantage of the present invention is the essentially transientless switching from one time constant circuit to the other while using a single amplifier. Thus, in one specific example the output signal remained within a few per cent of the theoretical value even immediately after switching from the short to the long time constant circuit.

Other objects and various advantages and features of the invention will become apparent by reference to the following description taken in connection with the appended claims and the accompanying drawing forming a part thereof. In the drawing:

Figure 1:
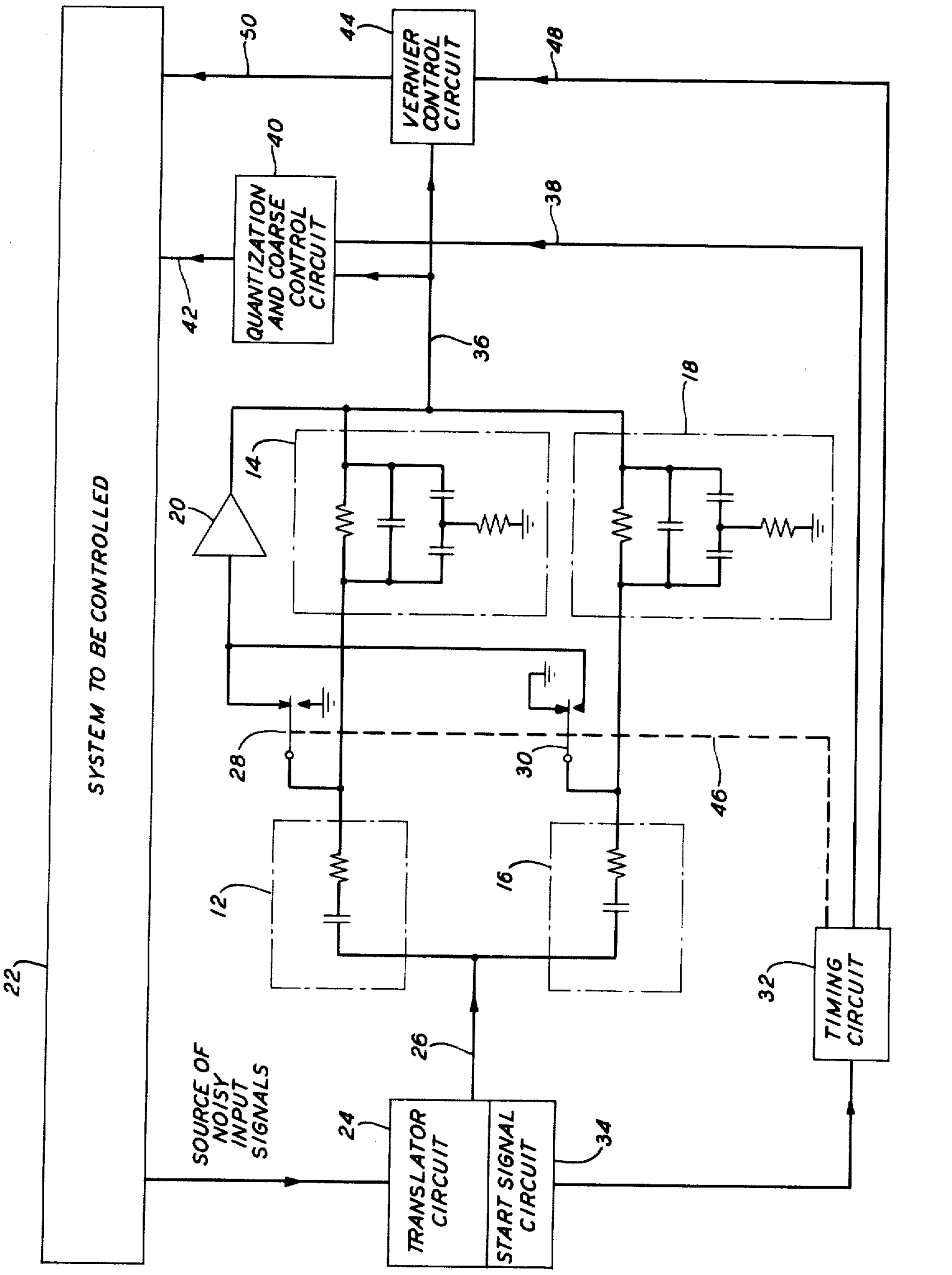
FIG. 1 is a schematic diagram of a smoothing circuit in accordance with the present invention and a system in which it may be employed.
Figure 2:
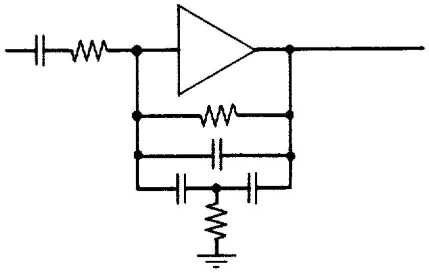
FIG. 2 is a known form of differentiation circuit.
Figure 3:
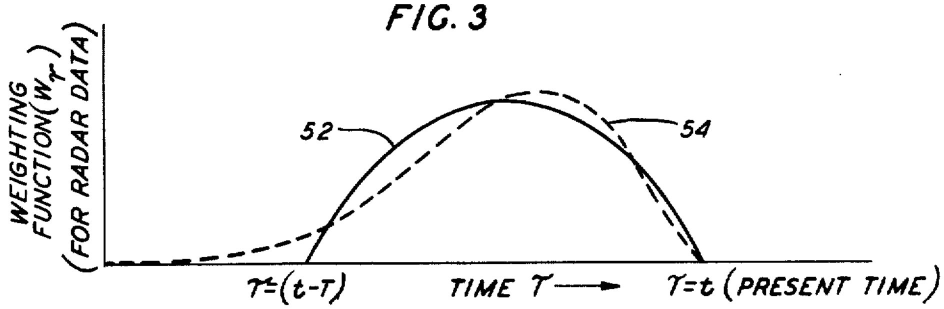
Figure 4:
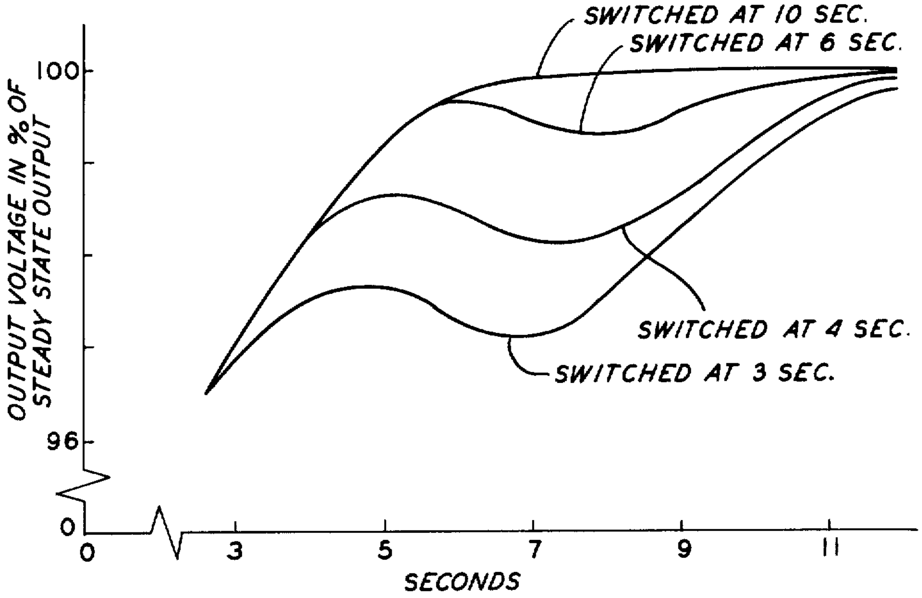
Figure 5:
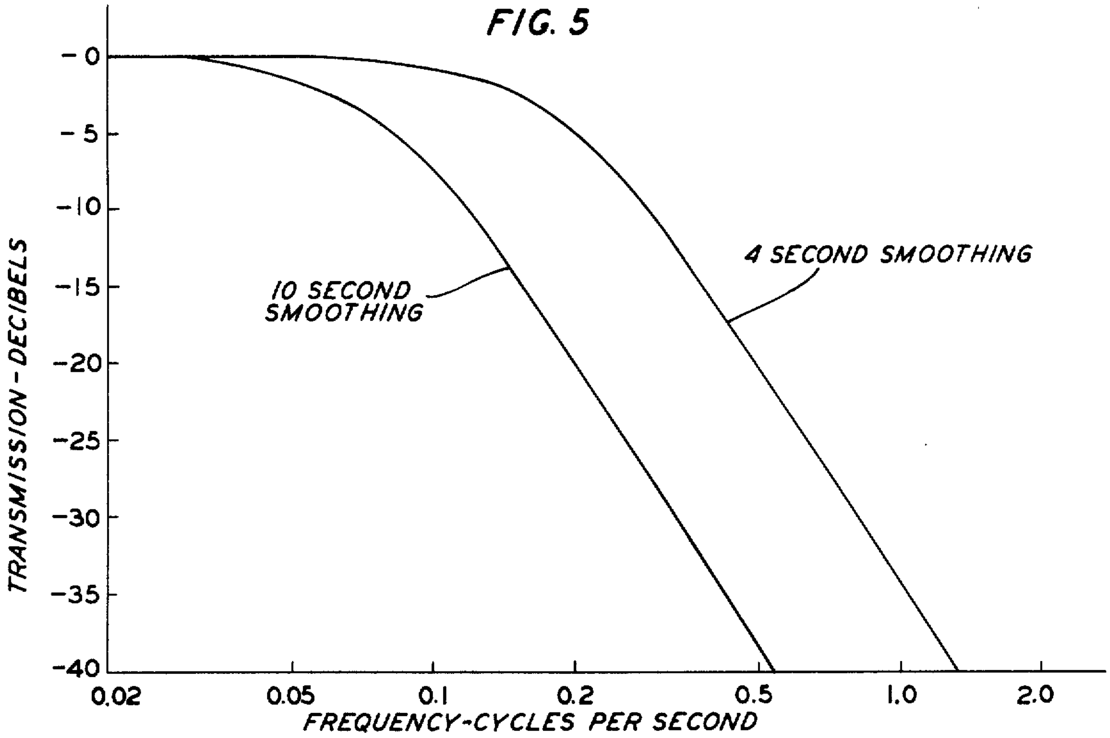
Figure 6:
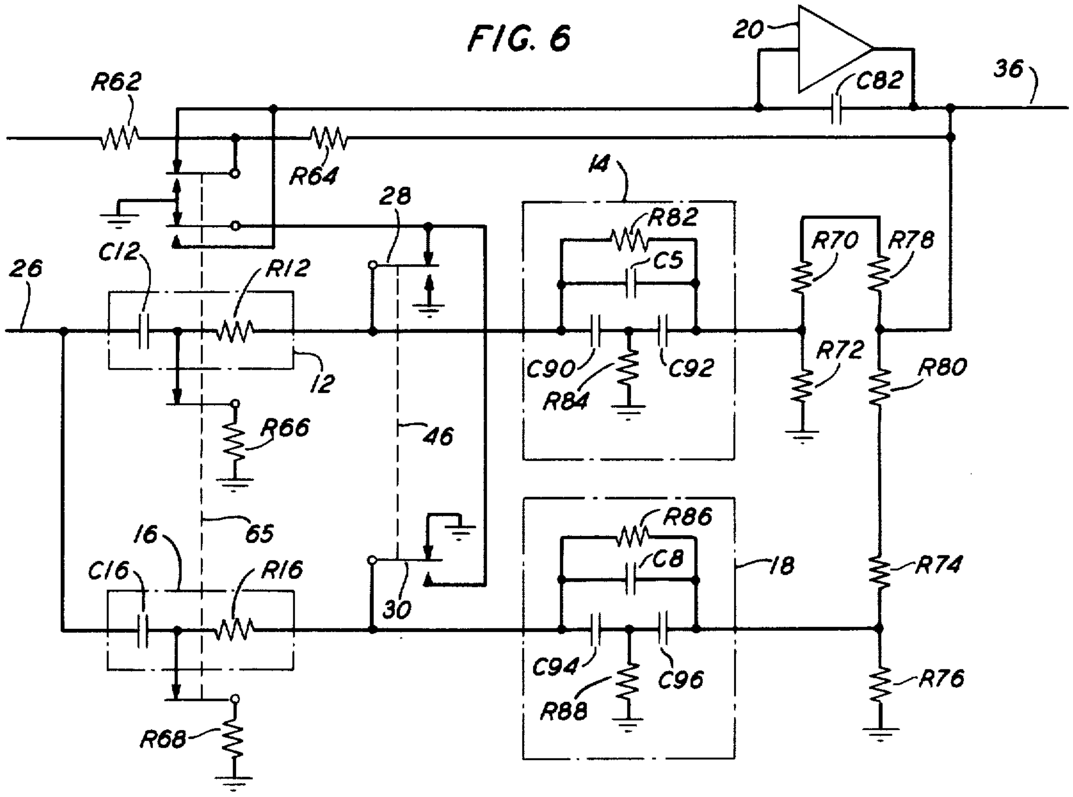

FIG. 3 indicates the relationship between ideal parabolic smoothing and smoothing as provided by a circuit such as shown in FIG. 2;

FIG. 4 indicates the output response of a circuit employing composite smoothing in accordance with the present invention with switching from one circuit to the other at the indicated time periods;

FIG. 5 shows noise suppression characteristics for smoothing functions having different time constants; and FIG. 6 is a detailed circuit diagram of the amplifier and associated networks of FIG. 1 as employed in one illustrative version of my invention.

With reference to FIG. 1, the composite smoothing circuit in accordance with the present invention includes the four-second input network 12, the four-second feedback network 14, the ten-second input and feedback networks 16 and 18, respectively, and the direct current amplifier 20. The system to be controlled by the present composite smoothing circuit is indicated broadly at 22. This system may, for example, be a long range ballistic missile. Alternatively, the system to be controlled could include an enemy missile and an intercepting missile such as the NIKE. It is also contemplated that the present circuits are applicable to prediction circuits for complex chemical processes, for example.

Noisy input signals are received by the translation circuit 24 from the system 22. Thus, for example, the translation circuit 24 may include a radar system. Under these circumstances, position data may be applied on lead 26 to the input networks 12 and 16 of the composite smoothing circuit.

A pair of switches 28 and 30 are operated synchronously to couple the amplifier 20 selectively to the short time constant smoothing network comprising input network 12 and feedback network 14 (hereinafter referred to as 12–14) or to the long time constant smoothing network comprising input network 16 and feedback network 18 (hereinafter referred to as 16–18). The operation of the switches 28 and 30 is under the control of the timing circuit 32. The operation of the timing circuit 32 is in turn controlled by the start signal circuit 34 associated with the translation circuit 24.

In operation, the translation circuit 24 supplies information to the start signal circuit 34 indicating a new cycle of operation in the system 22 which is to be controlled. The new cycle of operation could, for example, involve the detection of an incoming enemy aircraft. The amplifier 20 is initially coupled to the short, or four-second, smoothing network 12–14, as indicated in FIG. 1. Following a four-second interval, an approximate settled answer appears at output lead 36 from the composite smoothing circuit. At this time, a control signal may be applied on lead 38 to the quantization circuit 40. In accordance with the approximate output signal which appears on lead 36, a decision may be made by the quantization and coarse control circuit 40. Output signals indicating the required control action are then applied to the system 22 on lead 42.

Following an elapsed time interval approximately equal to the settling time of the short time constant smoothing network, the switches 28 and 30 are actuated by the timing circuit 32, as indicated by the control dashed line 46. This switching action has the effect of disconnecting the short time constant smoothing network 12–14 from amplifier 20, and inserting the long time constant smoothing network 16–18. It may be noted, however, that the output signals from the amplifier 20 have been applied to precharge the feedback network 18. Similarly, input signals have been applied to the input network 16. In view of the usual mode of operating direct current feedback amplifiers of this type with the input near ground potential, the actuation of the switch 30 introduces no significant transients into the composite smoothing network. The transition from the short to the long time constant smoothing network is therefore accomplished without any associated discontinuity in output signal. Following the switchover to the long time constant smoothing network, the vernier control circuit 44 is enabled by signals from the timing circuit 32 applied on lead 48. In the time interval between the four-second settling time of network 12–14 and the ten-second settling time of network 16–18, the output signals on lead 36 increase in accuracy. From this time forward until the completion of the cycle in the system 22, accurate settled signals are available on the output lead 50 from the vernier control circuit 44.

One illustrative example of the use of the present circuits would be for the control of a NIKE anti-aircraft missile. When used for this purpose, the output signals from the quantization and coarse control circuit 40 could select the type of engagement, whether normal surface-to-air or low altitude, the type of warhead, and it could also be employed to set the minimum burst altitude circuits for the interception. At a subsequent time following the switchover to the long time constant circuit, the vernier control signals on lead 50 could be utilized to provide the final course correction signals to the missile to insure accurate interception.

The composite smoothing circuits of the present invention may also advantageously be employed in the ballistic missile control system disclosed in S. Darlington, patent application Ser. No. 513,309, filed June 6, 1955, now U.S. Pat. No. 3,008,668, granted Nov. 14, 1961. The smoothing circuit shown in that patent application is reproduced as FIG. 2 in the present drawing. The weighting circuit of FIG. 2 is designed to approximate parabolic smoothing. In this regard, with a radar system alone, parabolic smoothing is optimum under radar error spectrum conditions described in H. W. Bode U.S. Pat. No. 2,492,351. In FIG. 3, a parabolic smoothing function is shown at 52. The curve 54 represents the approximation which is obtained by the weighting circuit of FIG. 2. In general, when the nature of the error versus frequency spectrum of the information collection instruments is known, the optimum weighting function may be determined by a modification of the smoothing and extrapolation entries of Wiener and Kolmogoroff as described by H. W. Bode and C. E. Shannon in "A Simplified Derivation of Linear Least Squares Smoothing and Prediction Theory," Proceedings of the I.R.E., April, 1950.

A method of realizing smoothing networks having desired characteristics is indicated in R. L. Dietzold U.S. Pat. No. 2,549,065, granted Apr. 17, 1951. The smoothing circuits may, of course, be replaced by their digital equivalents if the associated circuits are digital in nature. The network of FIG. 2 is developed by setting up an expression which approximates the desired weighting function characteristic as closely as is required in a form which is known to be realizable as an electrical circuit. The actual values of the components of the electrical network are then worked out in a known manner.

In the case of the smoothing network of FIG. 2, the following expression for the transfer admittance of an electrical circuit having the characteristic 54 as shown in FIG. 3 was developed.

$$Y(p) = \frac{1 + \frac{p}{70}}{1 + \frac{18p}{35} + \frac{3p^2}{28} + \frac{41p^3}{4200}}$$

where $Y(p)$ is the transfer admittance of the electrical network, and $p = i\omega$,
where $i$ is equal to the square root of $-1$, and
$\omega$ is the angular frequency.

The values of the other circuit elements of FIG. 2 are given by the following expressions:

$R_0C_0 = 0.2352T$
$R_1C_0 = k$
$R_1C_1 = 0.2647T$
$R_1C_2 = 5.281T$
$R_2 = 0.001353R_1$ where the resistance elements $R$ are specified in megohms,
the capacitance values are in microfarads,
$T$ is the smoothing interval in seconds, and
$k$ is a scale factor having the dimensions of $$\frac{[\text{volt/(foot/second)}]_{out}}{[\text{volt/foot}]_{in}}$$

For the purpose of the two smoothing networks which are shown at 12–14 and 16–18 in FIG. 1, the same expressions would be employed; however, different values of T would, of course, be employed in the derivation of the component values.

When employed in the system of the S. Darlington application cited above, the dual time constant smoothing circuit would permit prompt correction of the flight path early in the trajectory. In addition, after switchover to the long time constant circuit, more accurate final control signals would be available in the final moments before the missile leaves the range of the radar guidance system.

FIG. 4 indicates the response of the composite circuit of FIG. 1 with switching occurring at specified time intervals. In this regard, it may be recalled that the short time constant smoothing circuit has a settling time of approximately four seconds, and the long time constant smoothing circuit has a settling time of the order of ten seconds. As indicated in FIG. 4, switching at four seconds, the settling time for the short time constant circuit, produces an output signal which remains near 98 per cent of full value for three or four additional seconds and then approaches within a fraction of one per cent of full output value by the time nine or ten seconds have elapsed.

The other plots of FIG. 4 show the characteristics resulting from switching at three, six and ten seconds, in the absence of input noise. At first glance, it would appear that switching at six or ten seconds would be preferable to switching at four seconds. However, the noise suppression of the four-second network is much inferior to that of the ten-second network.

FIG. 5 indicates the advantage of ten-second smoothing over four-second smoothing in error suppression. In interpreting the characteristics shown in FIG. 5, it may be noted that noise signals having a frequency of 0.2 cycles per second, for example, have an output level when the ten-second smoothing network is used which is about 15 decibels below the level which these noise signals would have if the four-second smoothing network were in the circuit. It is therefore most desirable that switchover to the long time constant circuit be made with moderate promptness.

FIG. 6 is a detailed circuit diagram of the instrumentation of the amplifier and feedback circuitry of FIG. 1 in accordance with one specific embodiment of my invention. In FIG. 6 the amplifier 20 is provided with a third set of input and feedback networks in addition to the fast time constant circuit 12–14 and the slow time constant circuit 16–18. The resistor R62 at the input to the amplifier 20 is provided for test and precharge signal purposes. The feedback resistor R64 is in circuit with the amplifier 20 prior to the initiation of a normal timing cycle, as discussed above. It stabilizes the operation of the amplifier 20 prior to switchover to the smoothing networks 12–14 and 16–18.

The relay contacts associated with the dashed line 65 are switched upon initiation of the standard timing cycle, as discussed above. The resistors R66 and R68 are initially connected to points in the input networks 12 and 16. They are, however, disconnected by the actuation of the relay represented by the dashed line 65. Prior to the operation of the relay indicated by the dashed line 65, resistors R66 and R68 allow the condensers C12 and C16 in the input networks 12 and 16 to be charged to the proper direct current level. If these condensers were not charged to the proper initial level, false output transients would occur as a result of the differentiation action of the condensers in charging to starting conditions.

Two sets of output networks, each including three resistors, are provided in the circuit of FIG. 6. The first set includes the resistors R70, R72 and R78 and the second set includes the resistors R74, R76 and R80. These resistors allow adjustment of the output scale factor and permit temperature compensation of the circuits associated with amplifier 20. More specifically, the pair of resistors R70, R72 provides temperature compensation for the short time constant circuit, and the pair of resistors R74, R76 serves a similar function for the long time constant circuit. The resistors R78 and R80 are the final scale trimming resistors for the fast and slow time constant circuits, respectively.

The condenser C82 is used to provide direct current amplifier circuit stability prior to the switching of the relay contacts associated with the dashed line 65, when resistors R62 and R64 are active. Thereafter it is in shunt with the feedback networks 14 and 18.

With the exception of the matters specifically discussed in the preceding paragraphs, the operation of the circuit of FIG. 6 is as described above for the circuit of FIG. 1. For completeness, one specific set of values for resistors and capacitors which was successfully employed for the circuit of FIG. 6 is set forth below:

| Resistors | | | Capacitors |
|---|---|---|---|
| R62 = R64 = | 1 megohm | +0 −2% | C12 = C16 = 1 μF ±2% |
| R12 = 0.7912 | " | " | C90 = C92 = C6 = C7 = 0.72 μF ±1% |
| R16 = 1.978 | " | " | Cσ= C96 = 0.25 μF ±2% |
| R82 = 3.1667 | " | " | C82 = 560 μμF ±15% |
| R84 = 0.1642 | " | " | C5 = C8 = 0.25 μF ±2% |
| R88 = 0.4105 | " | " | |
| R86 = 7.89 | " | " | |
| R72 = 0.050 | " | " | |
| R70 = 0.149 | " | ±2% | |
| R76 = 0.129 | " | +0 −2% | |
| R74 = 0.075 | " | ±2% | |
| R66 = R68 = | 10,000 ohms ±10% | | |
| R78 = R80 = | 0 to 5,000 ohms | | |

It is to be understood that the above-described arrangements are illustrative of the application of the principles of the invention. Numerous other inventions, such as the use of smoothing circuits having other characteristics, may be devised by those skilled in the art without departing from the spirit and scope of the invention.

What is claimed is:

1. In a control system, a source of noisy input signals, means coupled to said source for smoothing said input signals, said smoothing means including an amplifier circuit and alternative long and short time constant smoothing circuits to be selectively employed with said amplifier circuit, means for initially selecting said short time constant circuit, circuit means responsive to the approximate output from said smoothing circuit utilizing said short time constant circuit for providing an initial coarse control signal, circuitry for precharging said long time constant smoothing circuit during the selection of said short time constant circuit, means for thereafter switching over to said long time constant smoothing circuit, and means responsive to said smoothing circuit utilizing said long time constant circuit for providing final vernier control signals.

2. A differentiation circuit having a short settling time and an effective long time constant comprising a direct current amplifier, a first smoothing network having a short time constant, a second smoothing network having a long time constant connected generally in parallel with said short time constant smoothing circuit, each of said smoothing circuits including input and feedback portions, means for coupling the output from said direct current amplifier to corresponding terminals of the feedback networks associated with said long and short time constant smoothing networks, and switching means for initially connecting the midpoint between the input and feedback portions of said short time constant smoothing network to the input of said amplifier and the midpoint of said long time constant smoothing circuit to ground and for interchanging these connections following a time period at least equal to one-half of the settling time of said short time constant smoothing network.

3. A prediction circuit having a short settling time and an effective long time constant, a direct current amplifier, a first smoothing network having a short time constant, a second smoothing network having a long time constant connected generally in parallel with said short time constant smoothing circuit, each of said smoothing circuits including input and feedback portions, means for applying noisy input signals to the input portions of said first and second networks, means for coupling the output from said direct current amplifier to corresponding terminals of the feedback networks associated with said long and short time constant smoothing networks, and switching means for initially connecting the midpoint between the input and feedback portions of said short time constant smoothing network to the input of said amplifier and the midpoint of said long time constant switching circuit to ground and for interchanging these connections following a time period approximately equal to the settling time of said short time constant smoothing network.

4. In a control system, a direct current amplifier circuit, alternative long and short time constant smoothing circuits to be selectively employed with said amplifier circuit, means for initially connecting said short time constant smoothing circuit to said amplifier circuit, means for precharging said long time constant smoothing circuit during the time when said short time constant circuit is connected to said amplifier circuit, and means for thereafter switching said amplifier circuit over to said long time constant smoothing circuit.

5. In a control system, a direct current amplifier circuit, alternative long and short time constant smoothing circuits to be selectively employed with said amplifier circuit, each of said smoothing circuits including input and feedback portions, means for initially selecting said short time constant smoothing circuit, circuitry for precharging both portions of said long time constant smoothing circuit and for grounding the midpoint of said long time constant circuit during the selection of said short time constant circuit, and means for thereafter switching over to said long time constant smoothing circuit.

* * * * *